April 25, 1967     W. GÖRGE ET AL     3,315,980
SPRING SUPPORT FOR TRUCK BODIES
Filed Dec. 16, 1964

INVENTORS
Werner Görge
Alois Moser

BY Bailey, Stephens and Huettig
ATTORNEYS

April 25, 1967  W. GÖRGE ETAL  3,315,980
SPRING SUPPORT FOR TRUCK BODIES
Filed Dec. 16, 1964  3 Sheets-Sheet 2

INVENTORS
Werner Görge
Alois Moser

BY Bailey, Stephens and Huettig
ATTORNEYS

April 25, 1967  W. GÖRGE ETAL  3,315,980
SPRING SUPPORT FOR TRUCK BODIES
Filed Dec. 16, 1964  3 Sheets-Sheet 3

INVENTORS
*Werner Görge*
*Alois Moser*

BY *Bailey, Stephens and Huettig*
ATTORNEYS

United States Patent Office 3,315,980
Patented Apr. 25, 1967

3,315,980
SPRING SUPPORT FOR TRUCK BODIES
Werner Görge, Gauting, and Alois Moser, Dachau, Germany, assignors to Maschinenfabrik Augsburg-Nurnberg AG, Munich, Germany
Filed Dec. 16, 1964, Ser. No. 418,708
Claims priority, application Germany, Dec. 23, 1963,
M 59,366; Nov. 14, 1964, M 63,123
3 Claims. (Cl. 280—124)

This invention relates to an improved spring support for a truck body.

Cargo trucks which are commonly used are ordinarily trucks having their bodies carried entirely on the frame of the truck and tractor-trailer trucks having two or more axles. The weight of the truck body carrying the payload is, in both types of trucks, transferred to the frame of the truck and then to the wheel springs on the wheel axles and/or to the structural elements that support and guide the wheels. In the ordinary truck, the frame supports the entire weight of the body, while in tractor-trailer trucks, the tractor frame carries the front end of the trailer by means of a so-called saddle and thus the tractor frame carries a corresponding portion of the weight of the trailer and its cargo.

The difficulty of providing an appropriate spring suspension for the vehicle increases as the payload relationship of the vehicle rises. Especially in tractor-trailer trucks, varying and harmful vibrations occur because the loading on the tractor saddle varies considerably.

Also, the vehicle frame must be sturdily constructed in order to carry maximum payloads without damage.

An object of this invention is to produce a spring support for ordinary trucks and tractor-trailer trucks which has an optimum spring support and decreases the stress placed on the truck frame without incurring the above-described disadvantages.

In this invention, spring means are provided for carrying the load of a truck body to the wheels by way of the axles and/or the wheel guiding members. In this invention, at least a portion of the weight of the truck body is carried by the wheel spring means for the wheel, as well as, and/or, the wheel guiding members, and the remaining portion of the weight of the body is carried by body spring means.

A vehicle according to this invention has a separate spring suspension for the truck body, as well as a separate spring suspension for the truck frame, and thus the weight of the body and the frame are independently spring-supported at least as much as possible so that an optimum spring suspension can be chosen for the truck body and for the truck frame. The payload relationship which is carried by the spring-supported truck body can be chosen in such a manner that optimum adjustment of the spring suspension can be obtained. The vehicle thus has a very good spring suspension relationship. Furthermore, the vehicle frame is in any event only placed under a little stress from a portion of the payload so that it can be constructed more simply and lighter than has heretofore been possible.

In this invention, longitudinally extending or transversely extending cross levers are used for the direct transfer of a portion of the weight of the truck body onto wheel support means such as the axles and/or wheel guiding members, and these levers are designed for proper weight distribution. These are very easily constructed. In one form of the invention, a lever extending parallel to the longitudinal axis of the vehicle is used, which lever is pivotally connected at one end to the vehicle frame on a transverse axis and whose other end is supported on the wheel axles and/or wheel guide members. The weight of the truck body is carried by the lever at some point between the ends.

In another form of the invention, the frame of the vehicle is extended by a lever, and to which lever the wheels are attached. A body spring is inserted between the lever and the rear end of the vehicle frame.

When the vehicle has two or more axles within the range of the spring suspension, then an equalizing beam is used between the wheel axles and the levers for distributing the weight of the body to the axles.

The means by which the objects of the invention are obtained are described more fully with reference to the accompanying schematic drawings in which.

Figure 1:
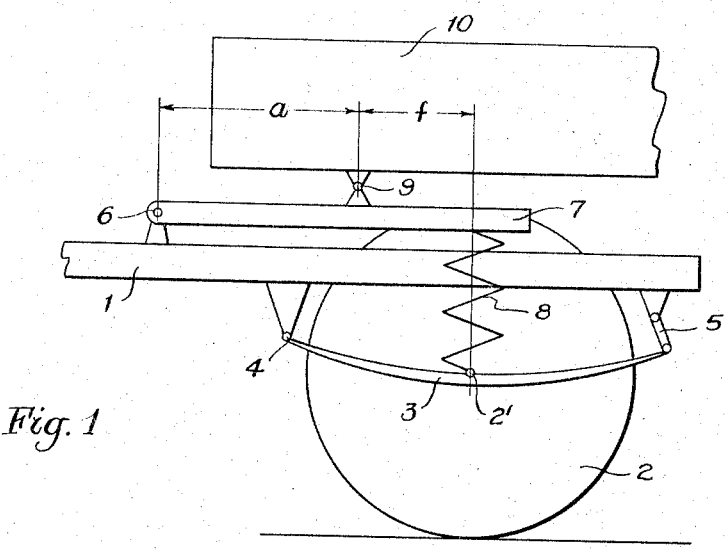
FIGURE 1 is a side view of the rear end of a tractor-trailer truck showing the spring support of this invention.

In FIGURE 1, only the rear end of a tractor frame 1 is shown. The back wheels 2 are mounted on a wheel support means composed of an axle 2' which is joined to a leaf spring 3, there being a leaf spring for each rear wheel. The front end of the leaf spring 8 is held by a bolt 4 to a bracket secured to frame 1, while the rear end of the spring is connected to a similar bracket by means of a double link 5. Springs 3 are the wheel springs.

Frame 1 is composed of two parallel members connected by crossbeams. One of the crossbeams carries a joint 6 connecting lever 7 with frame 1. The rotational axis of joint 6 is directed transversely of the longitudinal axis of frame 1. Preferably this joint has a resilient rubber bearing so that lever 7 is pivotally connected to frame 1 by a universal-type joint freely movable in all directions within limits. Joint 6 is positioned in the vertical plane of the longitudinal center line of frame 1. The rear end of lever 7 is engaged with body spring means composed of a spring 8 which rests on the axle 2'. A pivot joint 9 having its longitudinal axis directed transversely of the frame 1 supports the weight of the trailer body 10 at a point intermediate of the ends of the lever. This point is in the vertical plane of the longitudinal center line of frame 1 at a distance between joint 6 and spring 8 which depends upon the loading characteristics for the particular weight supported.

Joint 6 transfers a portion of the weight of the body to frame 1 and thus to springs 3, and another portion of the weight to lever 7 and spring 8 and thus to axle 2'. The portion of the weight of body 10 transferred through lever 7 to spring 8 is determined by the lever ratio as shown by the distances $a$ and $f$. By means of a corresponding ratio, an optimum proportion of the weight of body 10 is transferred through joint 9 to frame 1 and thus to springs 3. If the entire weight is to be transferred through lever 7, then the joint 6, the axle 2' and the spring 3 would have to lie in the same vertical plane.

Springs 8 are symbolically represented. They can be in the form of coil, rubber or air springs seated on the back axle and which engage lever 7 at their upper end. Moreover, leaf springs can be used for the springs 8 which would correspond to the leaf springs 3 seated on the axle 2' and connected to lever 7 by bolts or double links. When the leaf springs are used for the springs 8, the elasticity of joint 6 in the longitudinal direction of frame 1 may not be sufficient because of the limited movement possible in the rubber bearing of joint 6. In this case, the elasticity of the joint 6 in the longitudinal direction of frame 1 is increased by substituting a double link joint for the rubber bearing joint.

Figure 2:
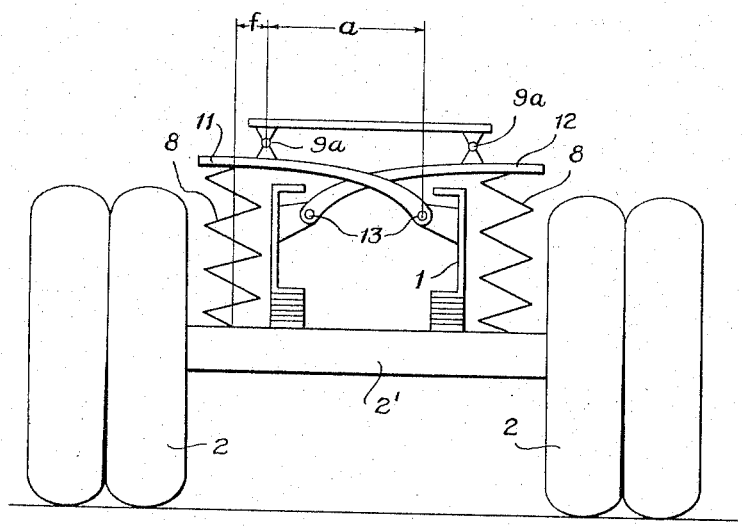
FIGURE 2 is an end view of a truck showing a modified form of the invention.

As shown in FIGURE 2, a pair of levers 11 and 12 are used which extend transversely of frame 1. Each lever is connected to one of the frame members by a joint 13 having its axis of rotation parallel to the longitudinal axis of frame 1. Each free end of the lever extends outwardly of frame 1 so as to be engaged with the upper end of a spring 8. The truck body is supported on the levers 11 and 12 by means of a pair of joints 9a, each having its axis parallel to the longitudinal axis of frame 1. Joints 9a have rubber bearings to provide limited universal movement. The ratio of the lever arms a–f determines the proportion of the weight of the body which is transferred through frame 1 to axle 2'. In FIGURE 2, each joint carries one-half the weight of the truck body, while in FIGURE 1, joint 9 receives the entire load of the front end of the truck body.

In FIGURE 2, springs 8 can be coil, rubber or air springs in the form of bellows springs. Such springs are sufficiently elastic so that their upper ends can follow the horizontal components of the vertical movements of the free ends of levers 11 and 12.

Figure 3:
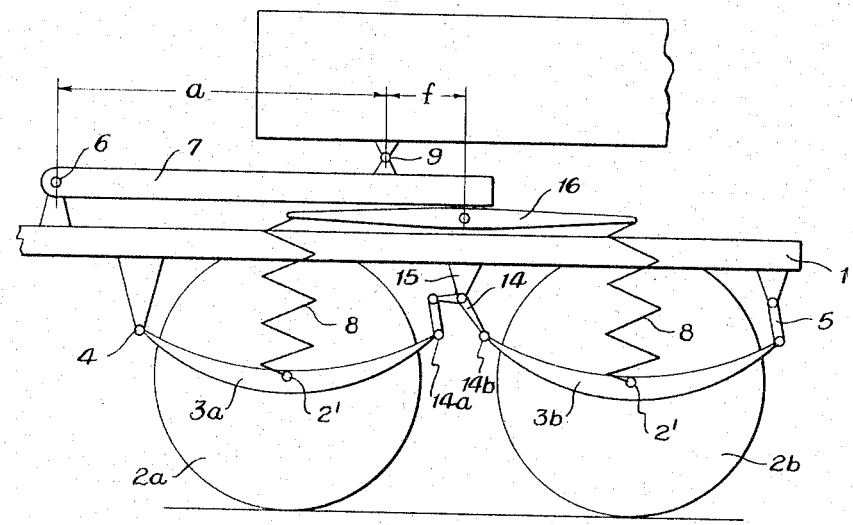
FIGURE 3 is a view similar to FIGURE 1 of a further modified form of the invention.

In FIGURE 3, the rear end of the tractor is provided with two pairs of wheels 2a and 2b. The front ends of leaf springs 3a are connected to frame 1 by a bolt joint 4, and the rear ends of leaf springs 3b join frame 1 by a double link 5. The adjacent ends of springs 3a and 9b are connected to each other by means of a crank 14 connected to spring 3a by a double link 14a and to spring 3b by a bolt 14b. Crank 14 is pivotally attached to a bracket 15 secured to frame 1. An equalizer beam 16 engages the upper ends of springs 8 and supports the free end of lever 7. In FIGURE 1, a pair of levers 7 are used, one for each side of frame 1. In turn, pairs of springs 8 and beams 16 are used. Each beam 16 has equi-distant arms so that each spring 8, of which there are four, will support one-fourth of the weight on joint 9 in the ratio of the lever distances a to f. As in FIGURE 1, coil, rubber, air or leaf springs can be used as the springs 8. With due consideration to the twisting of the frame and the structural tolerances which exist because of the larger structure, the various joints and linkages have to be movably constructed, as by being formed of rubber.

Figure 4:
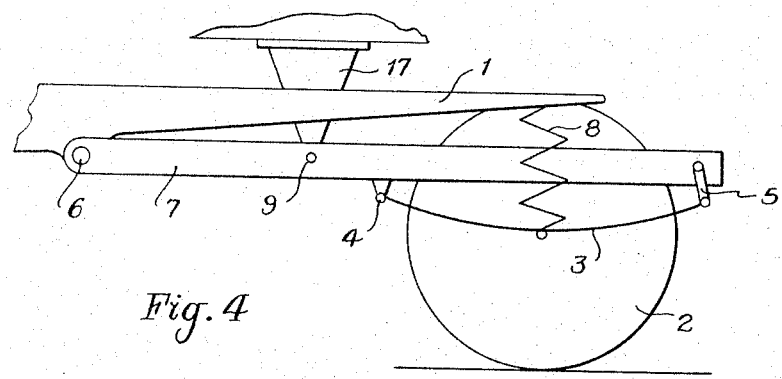
FIGURE 4 is a similar view of still another form of the invention.

In FIGURE 4, a pair of levers 7 are mounted beneath frame 1. These levers ordinarily lie in a horizontal plane so that the joints 6 and 9 will be as low as possible above the road surface, and so that the truck housing or trailer, during starting and stopping, will increase the load on the wheels at a reduced rate, and/or decrease the load on the wheels. The housing is carried on joint 9 by means of a supporting pin 17. Otherwise the assembly is basically similar to that of FIGURE 1.

If, instead of trailer bodies, the bodies of ordinary trucks having one or several axles are to be spring-supported according to this invention, then joints 9 are provided on the bottoms of the truck bodies. A total of three or four joints 9 are used for each body with corresponding lever and spring assemblies. Otherwise the systems are as described above.

With vehicles having independently suspended and guided wheels, the springs 8 are supported on the wheel guide members. These guide members when used with coil, air or rubber springs instead of leaf springs can be in the form of longitudinally or transversely extending levers. When leaf springs are used, only transverse levers are required with the wheel guide members.

Figure 5:
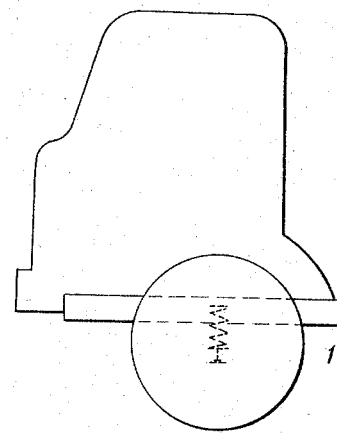
FIGURE 5 is a side view of a truck showing a further form of the invention.

In FIGURE 5, the frame 1 of the vehicle has its front end supported on springs in the usual manner. It includes a front wheel drive and the driver's cab. Frame 1 is extended rearwardly by lever 7 to which is attached springs 3 and axle 2' for the rear wheels. The front ends of springs 3 are pivoted in bolt joints 4, while the rear ends of the leaf springs are connected to lever 7 by links 5. The forward end of lever 7 is pivotally connected to frame 1 by joint 6 so that the lever is vertically movable. The truck body is carried on the joint 9 on lever 7. The rear portion of frame 1 ends in front of axle 2' in the form of a prong 7a extending between lever 7 and the lower end of a hook-shaped bracket 7b attached to lever 7. Coil springs 20 and 21 are the body spring means and extend between prong 7a and bracket 7b and between prong 7a and lever 7, respectively. These springs can be provided with conventional vibration dampeners.

In the spring support of FIGURE 5, road bumps are substantially stopped from being transmitted from the axle 2' to the frame 1 and the bouncing movements of the frame are changed into positive lifting movements. Thus optimum spring adjustment of the frame is obtained independently of an optimum spring adjustment for lever 7 which distributes the load of the truck body.

Figure 6:
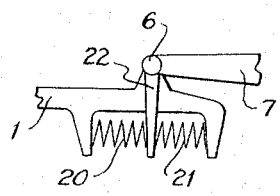
FIGURES 6, 7 and 8 are detail views of modifications of the spring support shown in FIGURE 5.
Figure 7:
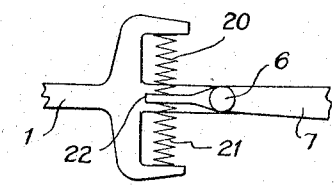
Figure 8:
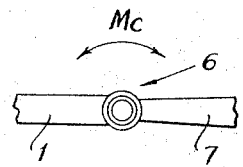

In the modification of FIGURE 6, the springs 20 and 21 extend horizontally in the longitudinal direction of the frame between downwardly extending flanges on the rear end of frame 1. Lever 7 engages the springs by means of a short lever 22. In FIGURE 7, the rear end of frame 1 has a pair of flanges spaced in a vertical plane which holds springs 20 and 21. In this modification, the short lever 22 extends horizontally into engagement with the springs. In FIGURE 8, the vehicle frame 1 is joined to the lever 7 by means of a joint 6 including one or more torsion springs 23.

Having now described the means by which the objects of the invention are obtained, we claim:

1. A vehicle comprising a vehicle frame, vehicle wheels, vehicle wheel support means joined to said vehicle wheels, wheel spring means secured between said wheel support means and said frame, lever means having one end secured to said frame, body spring means mounted between the other end of said lever means and said wheel support means, and a vehicle body carried by said lever means intermediate the securement of said lever means to said frame and said body spring means for transferring proportionate parts of the weight of said vehicle body to said vehicle frame and to said wheel support means.

2. A vehicle as in claim 1, further comprising two pairs of wheels, and weight equalizer beam means extending between said lever means and said body spring means.

3. A vehicle as in claim 1, said lever means being pivotally connected to said frame by universal joint means and engaging said body spring means for transferring a portion of the weight of said body to said body spring means.

References Cited by the Examiner

UNITED STATES PATENTS

| | | | |
|---|---|---|---|
| 1,267,561 | 5/1918 | Lapham | 280—439 X |
| 2,821,409 | 1/1958 | Chalmers. | |

FOREIGN PATENTS

| | | |
|---|---|---|
| 1,189,461 | 3/1959 | France. |
| 198,542 | 6/1923 | Great Britain. |

BENJAMIN HERSH, *Primary Examiner.*

A. HARRY LEVY, *Examiner.*

W. A. MARCONTELL, M. S. SALES, P. GOODMAN,
*Assistant Examiners.*